US011884390B2

(12) United States Patent
Sorek et al.

(10) Patent No.: US 11,884,390 B2
(45) Date of Patent: Jan. 30, 2024

(54) MANAGING A FLEET OF SPRAYING AERIAL VEHICLES

(71) Applicant: SKYX LTD., Ramat Hasharon (IL)

(72) Inventors: Eylon Sorek, Ramat Hasharon (IL); Itzhak Turkel, Lehavim (IL)

(73) Assignee: SKYX LTD., Ramat Hasharon (IL)

( * ) Notice: Subject to any disclaimer, the term of this patent is extended or adjusted under 35 U.S.C. 154(b) by 748 days.

(21) Appl. No.: 16/982,807

(22) PCT Filed: Mar. 20, 2019

(86) PCT No.: PCT/IL2019/050313
§ 371 (c)(1),
(2) Date: Sep. 21, 2020

(87) PCT Pub. No.: WO2019/180716
PCT Pub. Date: Sep. 26, 2019

(65) Prior Publication Data

US 2021/0094688 A1 Apr. 1, 2021

(30) Foreign Application Priority Data

Mar. 20, 2018 (IT) ........................ 102018000003790

(51) Int. Cl.
*B64C 39/02* (2023.01)
*A01M 7/00* (2006.01)
(Continued)

(52) U.S. Cl.
CPC ......... *B64C 39/024* (2013.01); *A01M 7/0032* (2013.01); *B05B 13/005* (2013.01);
(Continued)

(58) Field of Classification Search
CPC .. B64C 39/024; A01M 7/0032; B05B 13/005; B64D 1/18; B64D 47/02;
(Continued)

(56) References Cited

U.S. PATENT DOCUMENTS 9,102,406 B2 8/2015 Stark et al.
9,382,003 B2 7/2016 Burema et al.
(Continued)

FOREIGN PATENT DOCUMENTS

CN 106774394 A 5/2017
CN 106997209 A 8/2017

*Primary Examiner* — Tyler D Paige
(74) *Attorney, Agent, or Firm* — NKL LAW; Jae Youn Kim

(57) ABSTRACT

A computing system is providing for managing a fleet of spraying vehicles by selecting one or more field zones to be sprayed by a fleet of spraying vehicles. The system reviews spraying requirements including material and quantity to be sprayed and reviews spraying vehicle parameters for each spraying vehicle in of the fleet. The system then calculates a travel plan for each spraying vehicle such that the selected field zones can be sprayed accordingly without spraying areas outside the selected field zones. Once in operation, the system verifies travel plan execution of each spraying vehicle and adjusts one or more travel plans in case of vehicle malfunctions, unexpected weather conditions, and unexpected field obstacles.

17 Claims, 10 Drawing Sheets

(51) Int. Cl.
*B05B 13/00* (2006.01)
*B64D 1/18* (2006.01)
*B64D 47/02* (2006.01)
*B64D 47/08* (2006.01)
*G05D 1/10* (2006.01)
*B64U 101/00* (2023.01)

(52) U.S. Cl.
CPC ............... *B64D 1/18* (2013.01); *B64D 47/02* (2013.01); *B64D 47/08* (2013.01); *G05D 1/104* (2013.01); *B64D 2203/00* (2013.01); *B64U 2101/00* (2023.01); *B64U 2201/00* (2023.01)

(58) Field of Classification Search
CPC .... B64D 47/08; B64D 2203/00; G05D 1/104; B64U 2101/00; B64U 2201/00
USPC .......................................................... 701/3
See application file for complete search history.

(56) References Cited

U.S. PATENT DOCUMENTS

2014/0303814 A1* 10/2014 Burema ................. A01C 21/00
901/1
2016/0144734 A1* 5/2016 Wang .................... B60L 53/124
701/17

* cited by examiner

MANAGING A FLEET OF SPRAYING AERIAL VEHICLES

TECHNICAL FIELD

The present invention relates to crop spraying techniques in general and in particular to systems and methods for managing a fleet of spraying aerial vehicles.

BACKGROUND ART

Spraying agricultural crops with pesticides and other materials is a common practice in order to protect the crops from harmful pests and diseases. Pesticides can be sprayed manually, from vehicles on the ground or from the air. For large farmlands, it is faster to spray via the air.

Spraying aircrafts can dispense large quantities of materials (pesticides, fertilizers, etc.) in a fairly quick amount of time. Spraying aircrafts though have a few significant limitations: spraying aircrafts can mostly be flown during the day and in good weather (for pilots' safety) and since the aircraft needs to be high above the ground to avoid possible obstacles, the spraying accuracy cannot be guaranteed.

Unmanned Aerial Systems (UAS) also referred to as "drones" are commonly operator-based, and compared to aircrafts may fly at night, may fly at lower distances from the ground and can spray with more precision. The spraying material capacity of a UAS is obviously significantly smaller than that of an aircraft.

SUMMARY OF INVENTION

It is an object of the present invention to provide system and methods for managing a fleet of spraying vehicles.

It is another object of the present invention to provide system and methods for managing a fleet of aerial spraying vehicles.

It is a further object of the present invention to provide system and methods for managing a fleet of unmanned aerial spraying vehicles.

It is yet another object of the present invention to provide system and methods for managing a fleet of heterogeneous unmanned aerial spraying vehicles.

It is yet a further object of the present invention to provide system and methods for managing a fleet of manned and unmanned spraying vehicles.

The present invention relates to a computerized system comprising:

at least one processor; and at least one memory communicatively coupled to the at least one processor comprising computer-readable instructions that when executed by the at least one processor cause the computing system to implement a method of managing a fleet of spraying vehicles, the method comprising:

selecting one or more field zones to be sprayed;

receiving field zone parameters for each selected field zone comprising at least selected spraying material and quantity for each field zone or portion of field zone;

receiving spraying vehicle parameters for each spraying vehicle in of the fleet;

calculating a travel plan for each spraying vehicle of said fleet of spraying vehicles such that the selected field zones can be sprayed accordingly without spraying areas outside the selected field zones, and all spraying vehicles maintain a predetermined safety distance from each other while flying;

once in operation, verifying that the predetermined safety distance is maintained between all spraying vehicles, and if the safety distance is not maintained, modifying one or more of the travel plans by taking one or more correction actions comprising: modifying one or more flight paths, changing the order of one or more flight segments assigned to a spraying vehicle, reducing the speed of one or more spraying vehicles, and increasing the speed of one or more spraying vehicles, or any combination of correction actions thereof; and once in operation, verifying travel plan execution of each spraying vehicle, and adjusting one or more travel plans in case of vehicle malfunctions, unexpected weather conditions, and unexpected field obstacles.

In another aspect, the present invention relates to a computerized method comprising at least one processor; and at least one memory communicatively coupled to the at least one processor comprising computer-readable instructions that when executed by the at least one processor implement a method of managing a fleet of spraying vehicles, the method comprising:

selecting one or more field zones to be sprayed;

receiving field zone parameters for each selected field zone comprising at least selected spraying material and quantity for each field zone or portion of field zone;

receiving spraying vehicle parameters for each spraying vehicle in of the fleet;

calculating a travel plan for each spraying vehicle of said fleet of spraying vehicles such that the selected field zones can be sprayed accordingly without spraying areas outside the selected field zones, and all spraying vehicles maintain a predetermined safety distance from each other while flying;

once in operation, verifying that a predetermined safety distance is maintained between all spraying vehicles, and if the safety distance is not maintained, modifying one or more travel plans by taking one or more correction actions comprising: modifying one or more flight paths, changing the order of one or more flight segments assigned to a spraying vehicle, reducing the speed of one or more spraying vehicles, and increasing the speed of one or more spraying vehicles, or any combination thereof; and once in operation, verifying travel plan execution of each spraying vehicle, and adjusting one or more travel plans in case of vehicle malfunctions, unexpected weather conditions, and unexpected field obstacles.

MODES FOR CARRYING OUT THE INVENTION

Figure 1:
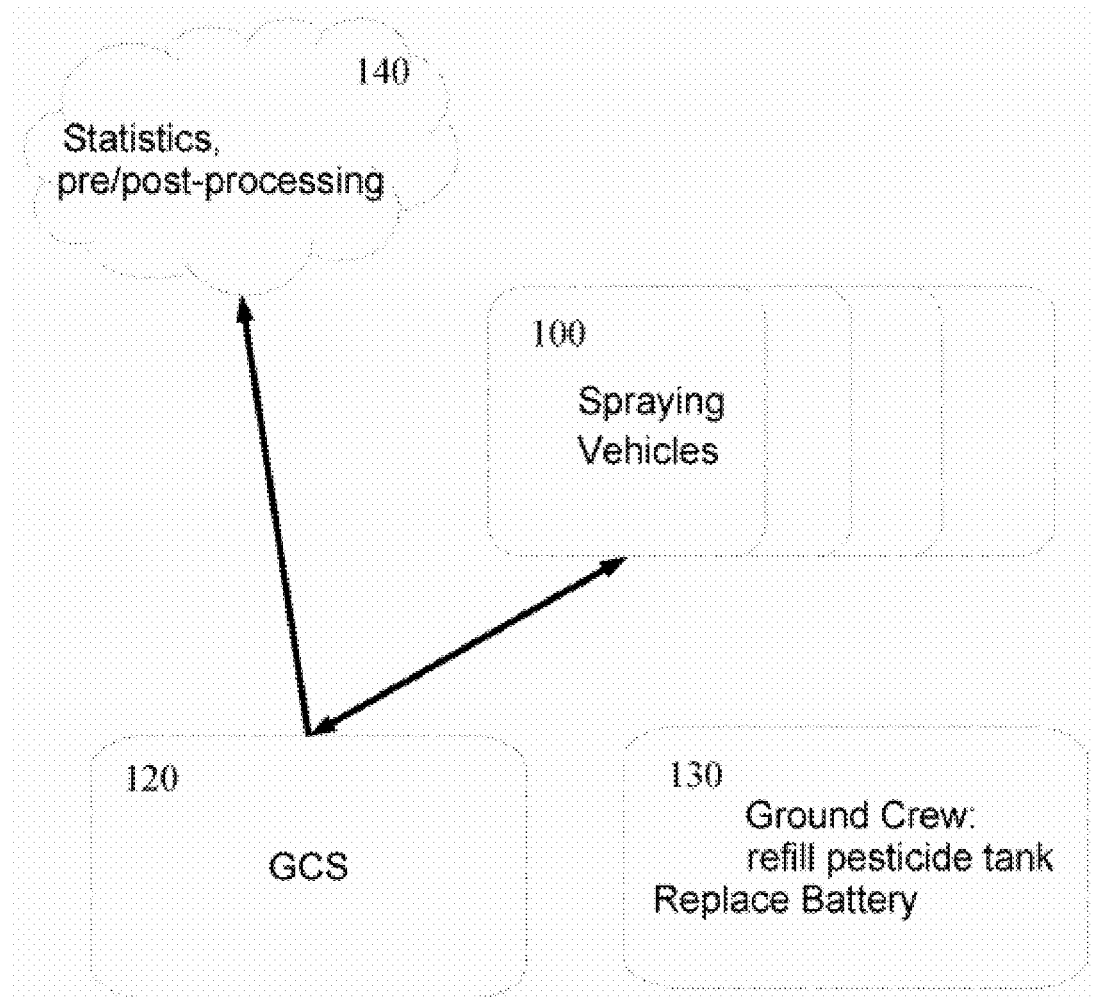
FIG. 1 is a block diagram of a system for managing spraying vehicles.

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to a computing system for implementing a method of managing a fleet of spraying vehicles. The spraying vehicles may be of different types including aerial and ground vehicles and can include both manned and unmanned vehicles.

The term "spraying" as used herein refers to spraying liquids, dispensing powder and dispensing smoke. The liquid or powder dispenses may be pesticides, insecticides or fertilizers.

Initially, the system is provided with a selection of one or more field zones to be sprayed including the geographical limits of each field zone. A field zone may be an entire field or any portion of a field. The field zone selection can be performed in several modes:

Fully automatic—providing the system with digital images of an area and applying image recognition techniques such as edge detection and image segmentation to recognize the delimitations of a field zone and identify obstacles within (such as a house, a pond etc. in the middle of a field). Alternatively, the system may be provided with exact geographic coordinates of the field zones.

Fully manual—a user views a digital image (map, photograph . . . ) of the area and manually delimits (by drawing, pointing or other selection means) the field zone boundaries.

Combination—obtaining geographical delimitations of a field automatically (as disclosed above) and then letting the user make adjustments manually like correcting delimitations and/or unselecting (delimiting out) and/or adding areas and obstacles that are not to be sprayed.

The digital image can be any image, photograph, map of an area, for example, a satellite photograph, a photograph obtained by a UAS etc.

Next, the system receives field zone parameters for each selected field zone. The field zone parameters comprise spraying requirements, including the selected spraying material (including spraying technique requirements) and quantity for each field zone or portion of a field zone. In addition, zone parameters can include one or more of: takeoff and landing points, no-fly zones, field zone obstacles (type, delimitations, height), legal limitations (i.e. flight hours, allowed noise levels, forbidden spraying materials . . . ), required quantity of spraying material for each field zone.

Additionally, the field zone parameters may include: crop characteristics such as type, status, age, height; type of spraying material or materials to be used; and weather conditions.

In some embodiments, field images are processed to identify crop status and treatment requirement in sub-zones (spots) of the field. Each spot may require different spraying quantity, spraying material or no spraying at all. Such image processing, may be a preprocessing step performed by $3^{rd}$ parties and the results provided to the system.

Next, the system receives spraying vehicle parameters about each spraying vehicle in the fleet. The spraying vehicle parameters can include one or more of: power supply capacity (battery capacity for a UAS or electric ground vehicle, gas tank capacity for aircrafts or ground vehicles), battery life for electric vehicles (the number of times a battery can be charged before it needs to be replaced), spraying tank capacity, spray boom length, number of nozzles on each spray boom, spraying discharge speed, vehicle speed, available vehicle sensors.

The system then considers the selected field-zones, the available spraying vehicles and the spraying requirements and calculates a travel plan (path+height+speed+spraying angle+method of maneuvering) for each spraying vehicle, so that all selected field zones can be sprayed according to the spraying requirements. A travel plan may include multiple trips for a single spraying vehicle, for example, to refill the spraying tank (reservoir) and/or to change batteries or refill the gas tank. When calculating travel plans, the system assures that all the selected field-zones are entirely covered for spraying, and that no area outside the selected field-zones will be sprayed. Travel plans also need to account for all obstacles in the field and travel around and/or above and/or below them. A travel plan can be a flight path which comprises, for each flight segment, maneuvering directions such as flying in a straight line, changing altitude, flying in a swing motion (advancing while moving back and forth either sideways and/or up and down), flying in a zig-zag motion, or any combination thereof.

Travel plans can be calculated to optimize different requirements and preferences, such as to provide one or more of:

Shortest path travelled by the spraying vehicles;
Minimum battery/energy usage, that is maximize energy efficiency;
Minimum time with full payload;
Minimum U-turns;
Minimum returns to home/minimum hops;
Minimum time at home (timing for the fleet to take off and land); or
Minimum time to finish entire mission.

Travel plans (flight plan) assure an appropriate safety distance when flying from other spraying UASs and aircrafts.

It is advantageous that the UAS starts and finishes (is launched and lands) at the same point in order to avoid flight time without spraying, thus wasting battery power.

In some embodiments, travels plans are calculated via a Spanning Tree Coverage (STC) algorithm, dividing a field-zone into square-shaped grids. The width and height of the grid is twice the size of the spraying span the UAS produces, the spraying span being a combination of the spray boom length and the distance from the ground when spraying. The algorithm produces a Minimum Spanning Tree (MST) that includes all the area of the grids to be sprayed while avoiding obstacles, thus producing a spraying path that covers all areas to be sprayed.

In some embodiments, the STC grids are rectangle-shaped, wherein the length of the rectangle correlates to the length of the spray boom while the width of the rectangle correlates to the size of the opening of the nozzles along the width of the boom. For example, some nozzles are aligned along a circular boom (below the UAS engines) while other nozzles are aligned in a long-lined boom. In some embodiments, the grid length is adjustable and can be multiple number of the length of the spraying boom (for example: including 2.5 times of the boom length). Since UAS may come with different sizes and capacities, the grids produced for each UAS are adapted to that UAS size and features.

When planning multiple flights for the same UAS, it is important to take in consideration the estimated state of the resources of the UAS after each flight. For example, when relaunching, it might be that the spraying tank is full, but the battery is not a full capacity (but hasn't been changed yet)

so that upcoming flight should take into consideration the current state of the UAS battery.

For example, in a first flight the UAS may deplete its spraying material but still have for example 35% of its battery charged. In the second flight, the UAS will make a shorter flight with the spraying tank less than full since the battery capacity is not full and carrying less load decreases the energy consumption of the battery. Before the third flight, the battery will be changed with a new, fully charged battery and the spraying tank will be filled.

In some embodiments, the grid calculations may lead that a UAS may have different starting and ending points, which both can be different than the launching point. When the calculations produce a different starting and ending points in a grid, it is not mandatory to fly from the starting point to the ending point, and it is possible to fly from the ending point to the starting point, since the same territory will be covered in both cases. The system looks at these two points (calculated starting and end points) and decide as a starting point the point that is the closest to the launching point, since at launch the spraying tank (reservoir) will be at its fullest capacity it is preferred to travel as little as possible with the full load before reaching the starting point and starting to spray. As mentioned before, the heavier the load, the more power the battery consumes, thus when the tank is full, it is preferred to travel as less as possible in order to reach the starting point.

Spraying plans also need to take into consideration safety distances between different machineries so at no time two UASs are within a distance of less than a predetermined safety distance.

Maintaining a safety distance between UASs is critical to avoid possible collisions. The safety distance is addressed at two levels. At the planning level, each flight plan is calculated by taking into account the actual time of operation (flight) and making sure no other UAS comes within a predefined safety distance at any given time of the flight.

Once in operation, the system verifies at predetermined intervals (i.e. every second or every 3 or 5 seconds) that a predetermined safety distance is maintained between all spraying vehicles. The predetermined safety distance may vary for each spraying vehicle in operation, depending on the type of spraying vehicle and its speed and direction at any given moment. For example, for the same spraying vehicle, at a segment of higher travel speed, the required safety distance would be greater than the safety distance of another segment where the vehicle would travel at a lower speed.

If the system finds, once in operation, that the safety distance is not maintained between two (or more) spraying vehicles, the system will rectify the problem by immediately modifying one or more travel plans. The modified travel plan will include one or more corrective actions comprising: modifying one or more flight paths, changing the order of one or more flight segments assigned to a spraying vehicle, reducing the speed of one or more spraying vehicles, increasing the speed of one or more spraying vehicles or any combination thereof.

Rectangle-based grids are more adapted than square-based grids for a spraying UAS, since the rectangle shape corresponds better to the actual shape of the spraying boom of the UAS and thus improves the access capability, precision and efficiency of the spraying. One drawback when using grids is precision, since an area is divided into fixed-sized grids (per UAS size). In some embodiments, in order to be able to cover smaller areas and increase the spraying precision, the system uses multi-layer grids. In one layer, a "rough" grid layer covers the majority of the area. Then, other layers offer smaller size grids to "fine-tune" the coverage and cover smaller areas, for increased coverage precision. In some cases, it might be needed to further fine-tune a flight path and calculate path adjustments (using computational geometry) to obtain full and precise coverage of a terrain.

In some cases, a spraying UAS may need to spray a plurality of relatively small-size areas (hot spots), each one with a different size and shape. The same methods as above can used to calculate a flight path with the added complexity of optimal selection of the order in which to access the hot spots. This scenario is a variation to a Travelling Salesman Problem (TSP). It is known that solving a TSP in an optimal way requires very significant computational resources, hence the system can use an approximation of the TSP solution.

For example, first using a clustering technique all hot spots are divided to a small number of clusters, up to 10 clusters. The number of clusters is selected according to the number of spraying vehicles available and is preferably identical to the number of spraying vehicles available or mathematical product of the number of spraying vehicles and their performance. For example: if the number of vehicles is 4, then the preferred number of clusters is 8, but if the number of vehicles is 3, then the preferred number of clusters will be 9. Each cluster comprises hot spots in the same geographical area. A single spraying vehicle covers each cluster. Such geographic separation reduces the risk of collision between different UAS. Because the number of clusters is relatively small, it is easier to calculate an optimal solution to the travel between clusters, or a very good approximation of the optimal solution.

In some embodiments, when calculating travel plans take into consideration also agricultural considerations. For example, sometimes the direction of furrows in a field will dictate flying along the furrows for more effective spraying, even if the theoretical calculations show that a different flying path is faster or more efficient.

In some embodiments, after the system has calculated the travel plans for spraying vehicles, a system operator receives the travel plans and is able to manually view, change or override any parameter manually and then view how that change affects the overall mission performance.

Once the travel plans are finalized and approved, they are sent for execution. For automated, autonomous vehicles such as UASs, travel plans (flight plans) are communicated electronically in a format or protocol supported by the autonomous vehicle. UASs comprise a flight controller ("brain") that controls and operates all the functions of a UAS. For example, such flight controllers are available from DJI (of 14th Floor, West Wing, Skyworth Semiconductor Design Building, No. 18 Gaoxin South 4th Ave, Nanshan District, Shenzhen, China, 518057). Pixhawk is an Open Source flight controller that is popular in the market. The system of the invention knows how to communicate flight plans to such and other flight controllers.

For manned spraying vehicles or for spraying vehicles operated by a human operator, the travel plans can be communicated to the pilot/driver/vehicle operator in any communication mean (email, a web site, a mobile application, printing on paper etc.).

Planned travel plans may not be entirely executed since once in operation, unplanned events or changes may affect the travel plan. For example, a drift in a flight path due to strong winds or GPS deviation; technical malfunctions such as GPS unavailability, a faulty compass, sensor malfunction (height sensor, distance sensor), battery draining faster than estimated etc. Other type of unplanned changes may be dynamic conditions in the field, for example, the planned launching point may be unavailable or inaccessible, or a new obstacle may be identified that needs to be accounted for (like trucks, animals, or people entering a field). Thus, once in operation, the system verifies travel plan execution of each spraying vehicle at predetermined intervals and adjusts one or more travel plans in case a deviation from a travel plan requires adjustment. The adjustment may be correcting the travel plan of the spraying vehicle whose travel plans have changed in the field, or the adjustment may change the travel plans of one or more spraying vehicles (such as taking over some work originally scheduled to be done by another spraying vehicle).

Once in operation, the system collects data regarding spraying vehicle status, spraying vehicle performance data and field surveillance information. The data is collected by sensors on the spraying vehicles and optionally enhanced by sensors in the field. The system analyzes the available information and sensor data received to identify deviations from planned travel plans. If the deviations exceed a predetermined threshold, the system will make a decision on how to respond to the deviations.

One option is a local correction by a single spraying vehicle that will adjust its travel plan so spraying coverage is not changed. Such corrections may be: pausing in the same location for a given time and then continuing as planned, a small deviation from the original plan and then returning to the original plan, moving to another location (sideways, higher up) for a given time and then continuing as planned.

Another option (when the deviations are of greater magnitude) is to recalculate by the system the travel plans of some or all spraying vehicles. Such recalculations can include: travel path adjustments by several spraying vehicles (each one recalculating its own adjustments), recalculating travels plans completely for some or all spraying vehicles so that an obstacle is avoided without missing any required spraying coverage. Another option is to abort the mission completely.

In some scenarios, an operator intervention might be required if automatic correction is impossible or unsuccessful. An operator may decide to order some or all UAS to land or pause at their current location or order some or all UAS to return to a given point (launching point, ending point . . . .)

Reference is now made to FIG. 1 showing s a block diagram of an embodiment of a system for managing spraying vehicles. A fleet of spraying vehicles 100 (of all types, both manned and unmanned) is connected to a Ground Control Station (GCS) 120 responsible for following the execution of the travel plans of all the spraying vehicles 100 and making adjustments if necessary. Ground crew personnel 130 is present to handle layovers between multiple trips of spraying vehicles 100, for example, refilling the tank (reservoir) with the spraying material, changing/recharging batteries, refilling gas etc. A server 140 receives execution data from the GCS 120 for pre/post-processing of the mission and for issuing reports. The information received by the server 140 helps also when planning future missions.

Figure 2:
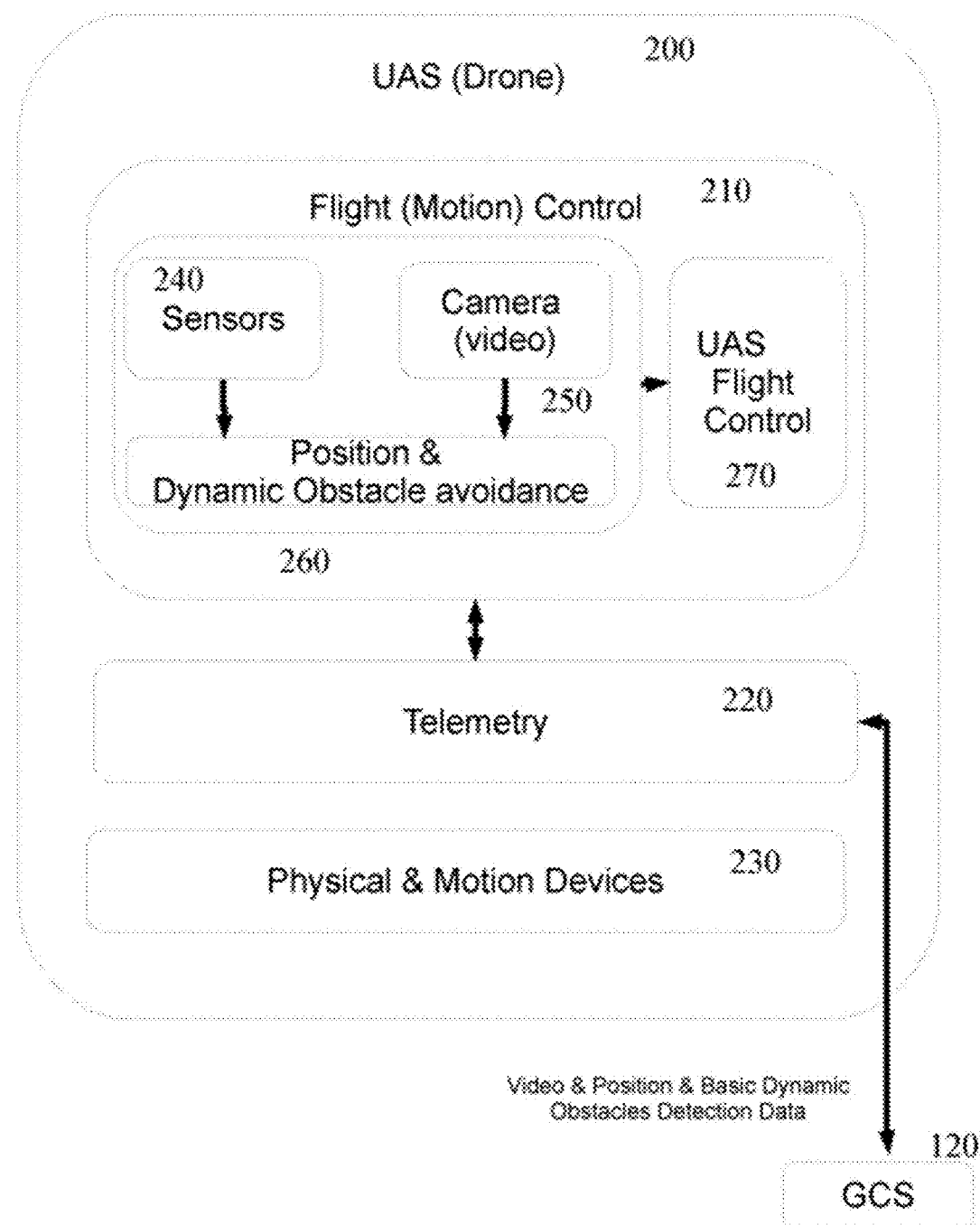
FIG. 2 is a block diagram of a UAS sub-systems.

FIG. 2 is a block diagram of a UAS sub-system. A UAS 200 has three main systems: a flight (motion) control 210, telemetry systems 220 and physical & motion devices 230. Input from different sensors 240 (such as a light source, a klaxon, a Light Detection and Ranging (LIDAR), LED light sources, Sonar detector, Infrared (IR), GPS, or Real Time Kinematic (RTK) receptor) and a camera 250 is provided to a position and dynamic obstacles avoidance module 260 in order to survey nearby and upcoming unexpected obstacles (like another flying object that is getting too close). Data from the different sensors 240, camera 250 and obstacles avoidance module 260 is provided to the UAS flight control module 270 that controls the actual flight operation and may take appropriate adjustments actions when possible. Telemetry systems 220 are in communication with the GCS 120 and other spraying vehicles to send and receive information. Physical & motion devices 230 are actuators that perform the movement of the spraying vehicles (engines, propellers).

Figure 3:
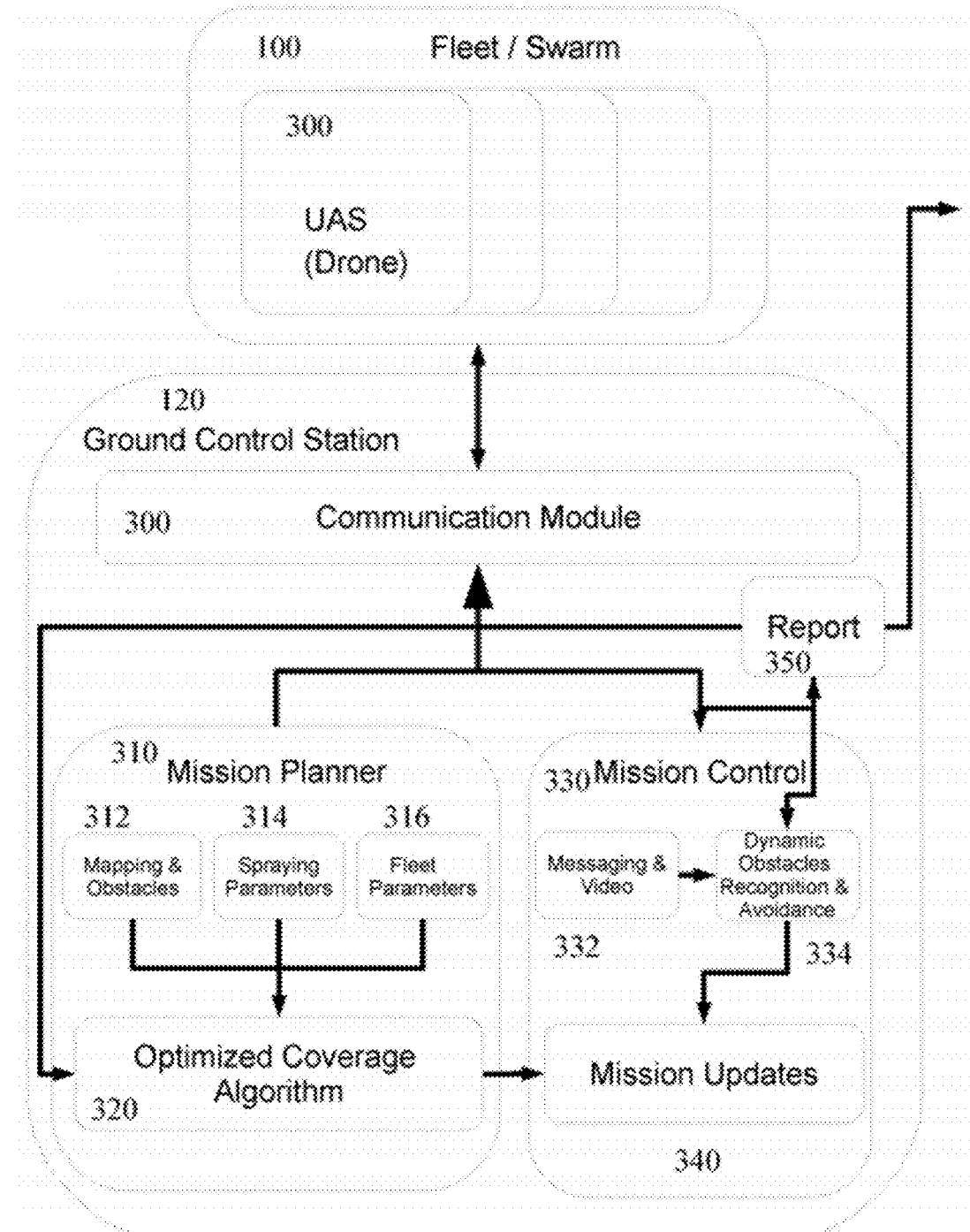
FIG. 3 is a block diagram of a ground control station sub-systems.

FIG. 3 is a block diagram of a ground control station sub-systems. The ground control station 120 has four main modules: a communication module 300, a mission planner module 310, a mission control module 330 and a report module 350. The communication module 300 is responsible for ongoing communications with the spraying vehicle fleet 100. Different communication protocols of the art may be used with different types and models of spraying vehicles. The mission planner module 310 receives field-zone parameters (from the mapping and obstacles module 312 and spraying parameters module 314) and spraying vehicles parameters (from the fleet parameters module 316). Based on all available information received, travel plans are produced by the optimized coverage algorithm module 320. Once in operation, the mission control module 330 follows up on the execution as the messaging & video module 332 receives messages and images (stills, video) and transfers them to the dynamic obstacles recognition & avoidance module 334 which when necessary issue mission updates by the mission updates module 340. A report module 350 issues reports after the spraying is done in order to report on the work performed.

Figure 4:
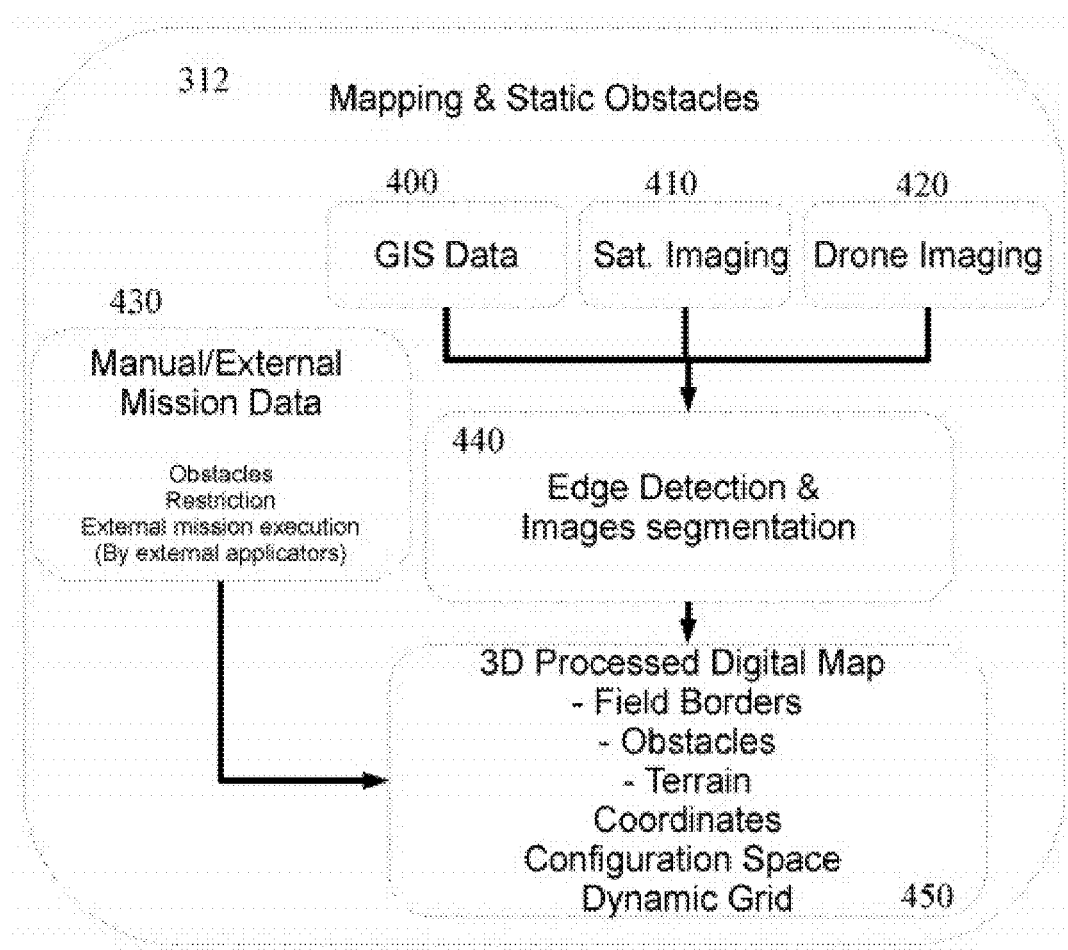
FIG. 4 is a block diagram a mapping module.

FIG. 4 is a block diagram the mapping module. The mapping module 312 receives mapping information from different sources: GIS maps from a GIS data module 400; satellite images from available sources from the satellite imaging module 410; and optionally drone images taken just before the mission from the drone imaging module 420. In addition, the manual/external module 430 allows receiving data from external sources, for example, no-fly zones, legal constraints and also allows the operator to manually enter data such as obstacle data.

The mapping data collected is processed by the image processing module 440 for edge detection and image segmentation, so that the 3D digital map module 450 can provide digital maps including recognized field borders, obstacles, terrain coordinates and other necessary mapping data.

Figure 5:
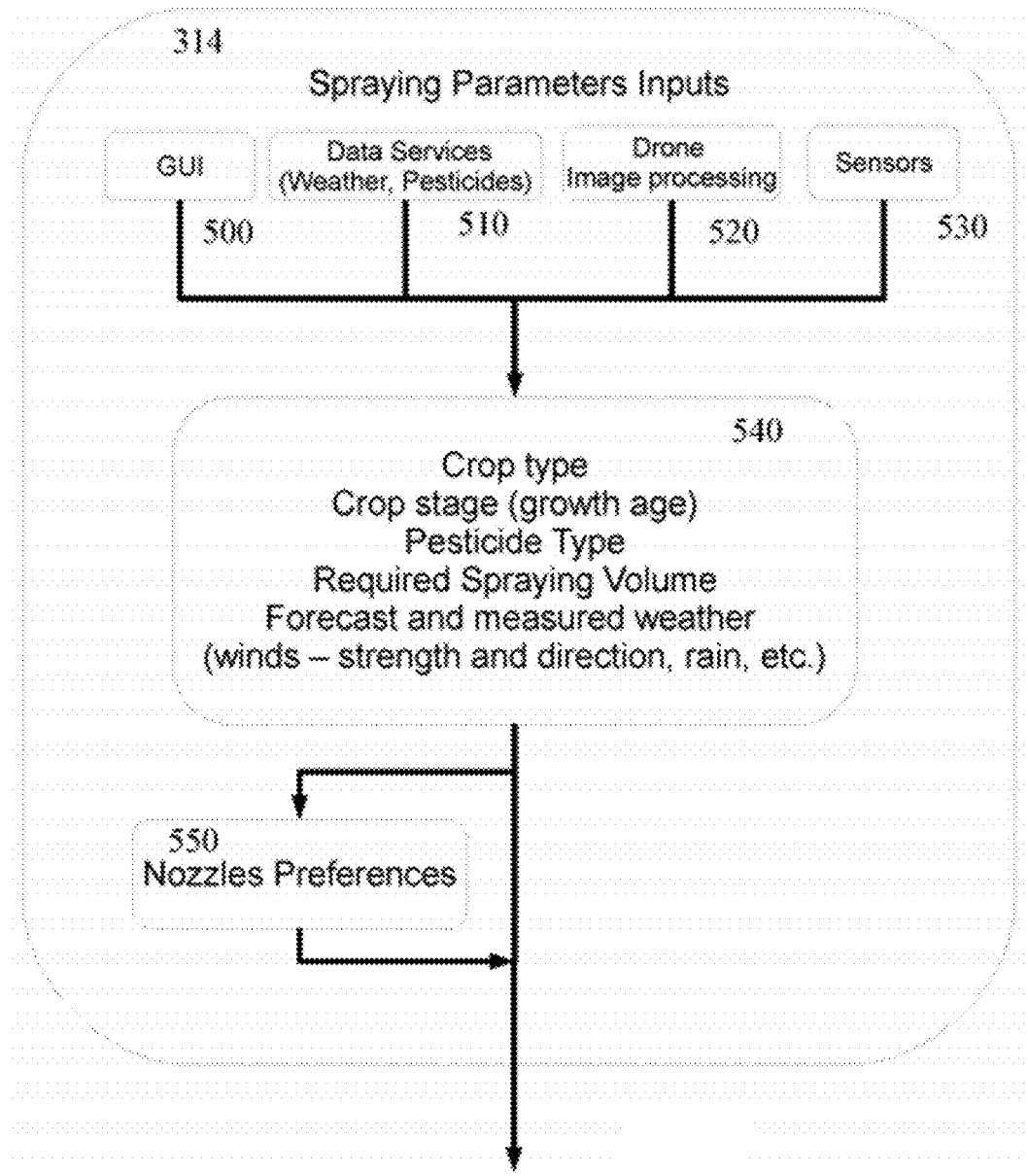
FIG. 5 is a flow diagram of the process agricultural information processing.

FIG. 5 is a flow diagram of the process agricultural information processing. The spraying parameters module 314 is in charge of receiving the agricultural data for performing the spraying mission. The data is received from different sources that can include: user manual input from the GUI module 500; data from $3^{rd}$ party databases and sources such as weather forecast, provided by the data services module 510; data processed from the drone image processing module 520, providing information retrieved from drone (UAS) images such as direction of furrows, crop height etc.; and data received from sensors in the field, for example, pests identification. The field-zone module 540 receives information about the type of crop, the crop stage (growth age), required material to be used (pesticide, fertilizer etc.), the required spraying volume, weather forecast, wind strength and direction, direction of furrows etc. Finally, in 550 nozzle preferences will be either determined dynamically or taken as an imposed condition initially.

Figure 6:
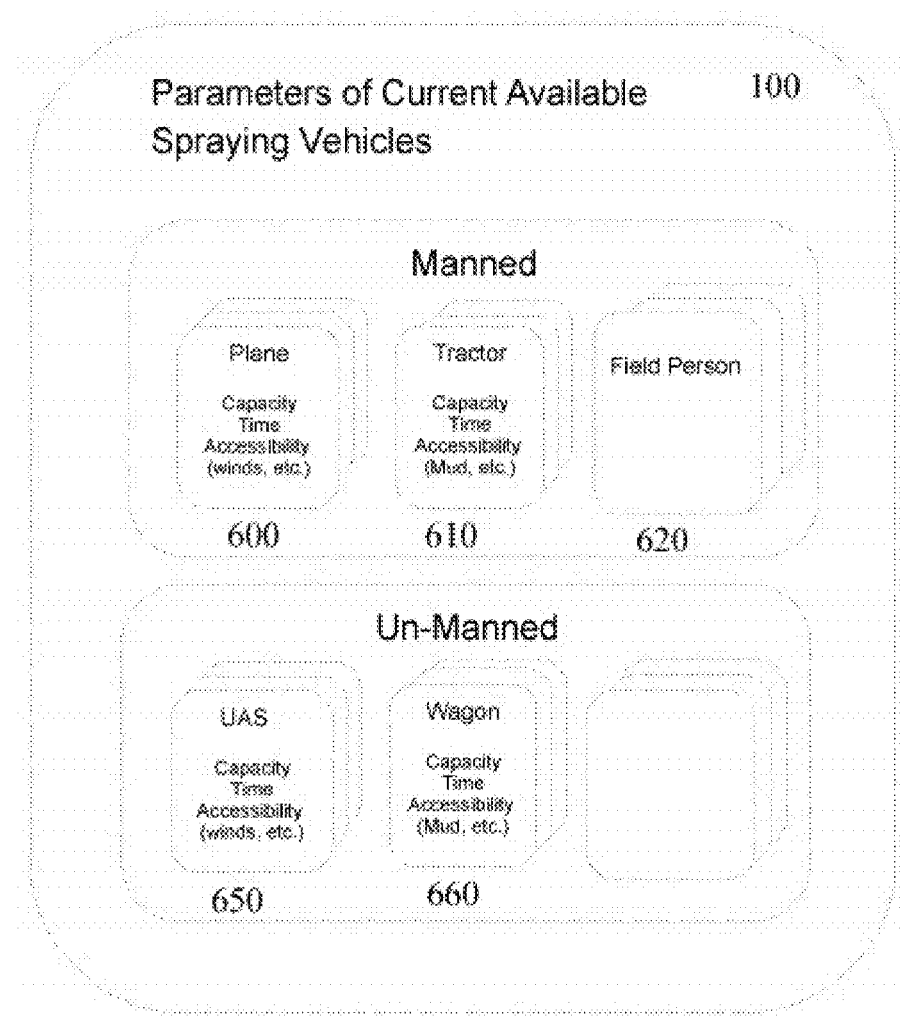
FIG. 6 is a block diagram of a fleet of spraying vehicles.

FIG. 6 is a block diagram of a fleet of spraying vehicles. A fleet of spraying vehicles 100 may include both manned and unmanned vehicles from different types, makers, models etc. Manned vehicles may include aircrafts 600, ground vehicles 610 like tractors and even field people 620. Unmanned vehicles may include UAS 650 and autonomous ground vehicles 660.

Figure 7:
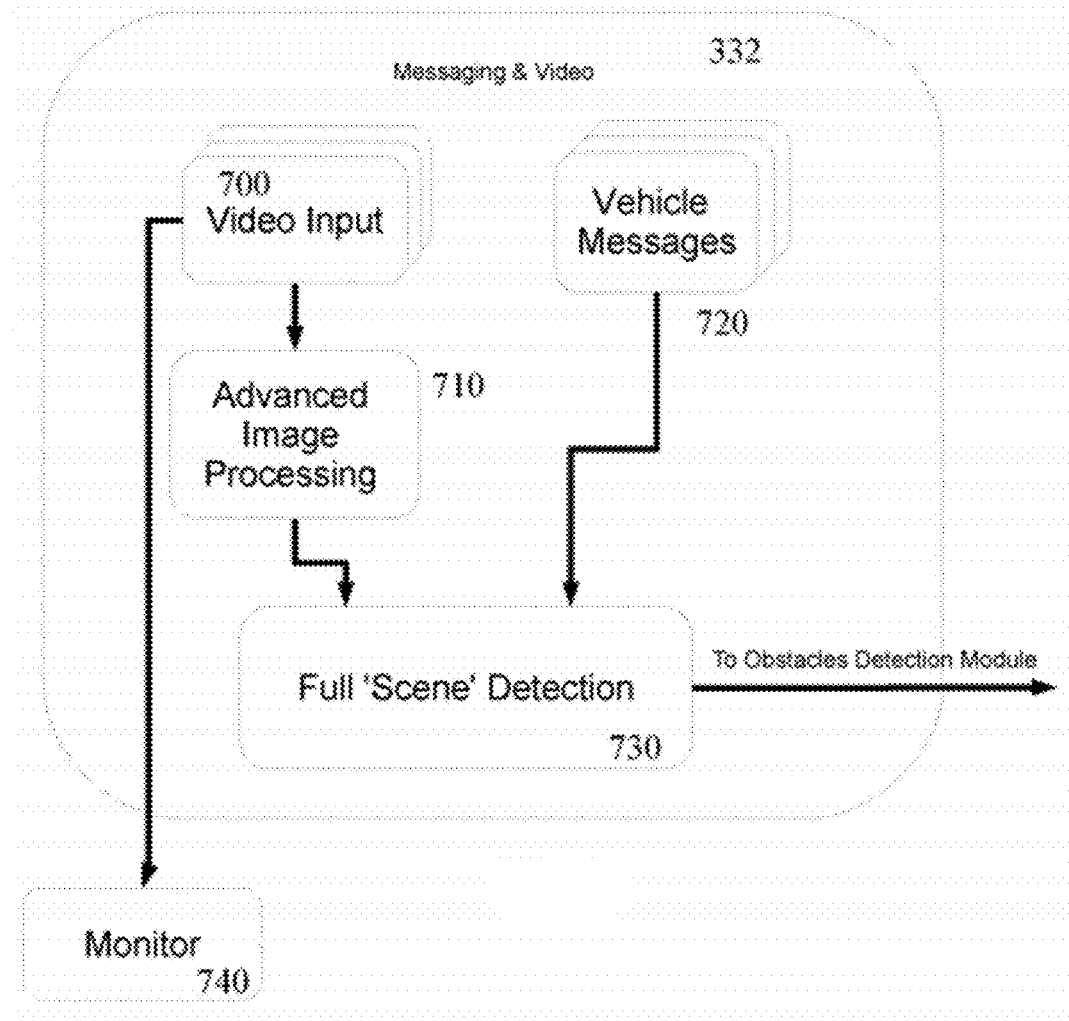
FIG. 7 is a block diagram of a messaging & video module.

FIG. 7 is a block diagram of a messaging & video module of the mission control. The video input module 700 receives video images from different spraying vehicles, and passes the images (stills and/or video) to the advanced image processing module 710 for processing. Combined with spraying vehicle messages received by the vehicle messages module 720, the scene detection module 730 produces scene images in real-time or near-real time of the spraying actions, images that can be viewed by a monitor 740 in addition to being sent to the obstacle detection module.

Figure 8:
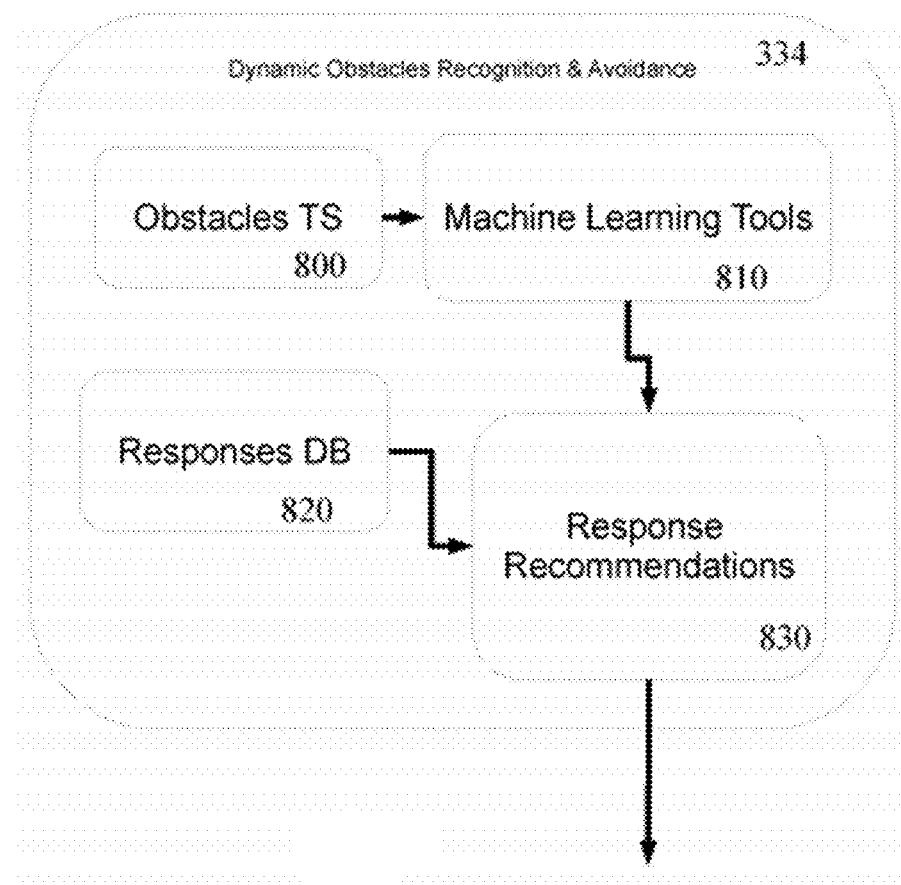
FIG. 8 is a block diagram of a dynamic obstacle recognition module.

FIG. 8 is a block diagram of a dynamic obstacle recognition module 334. Obstacles data are provided by the obstacles TS (Training Set) module 800 into the machine learning module 810 and together with a known responses database 820 the response module 830 issues response recommendations to the dynamic obstacles encountered.

Figure 9:
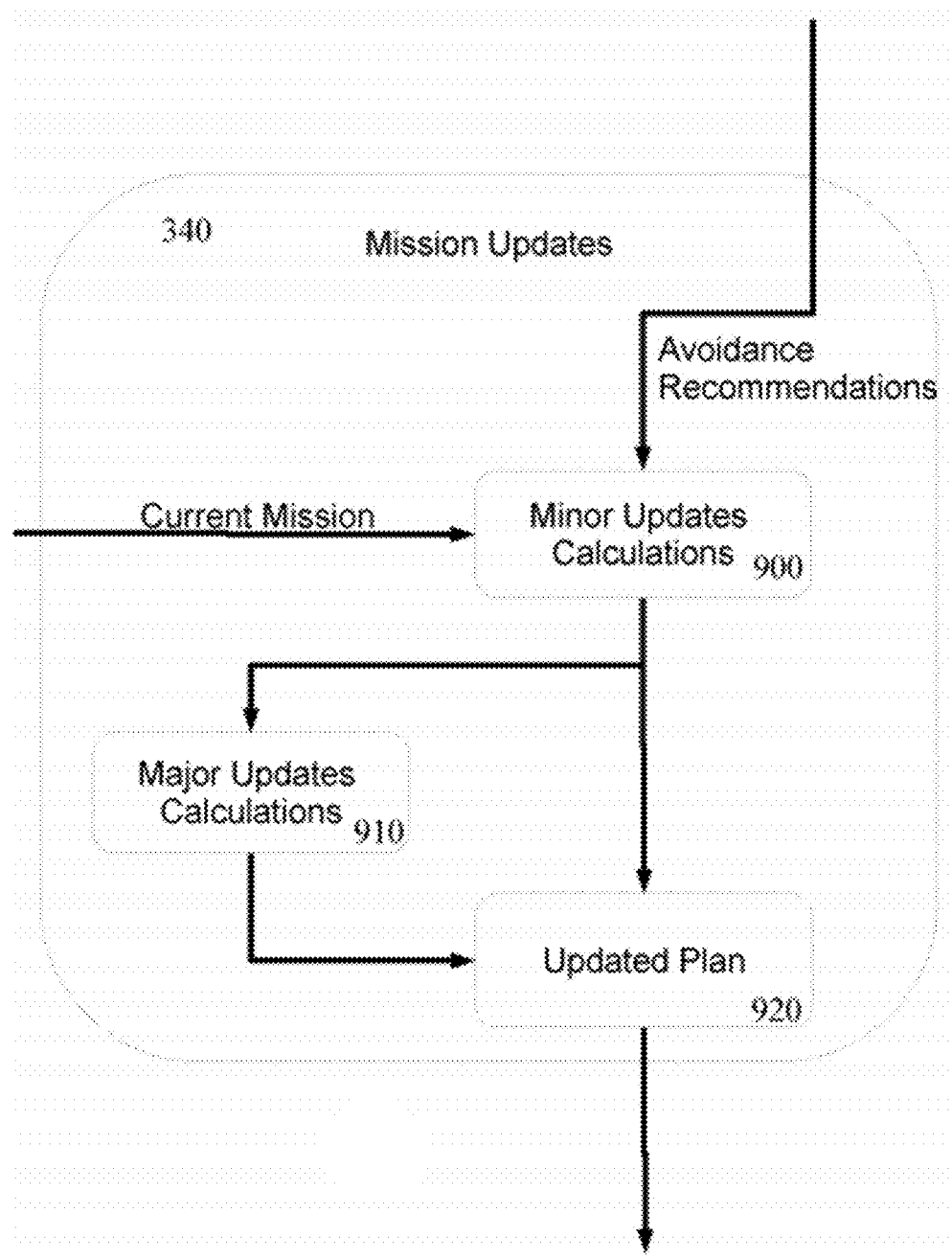
FIG. 9 is a flow diagram of a mission updates module.

FIG. 9 is a flow diagram of a mission updates module 340 that handles unexpected events in the field. Taking into account the current mission status and unexpected (dynamic) obstacle information received, the mission updates module 340 will calculate a response that is within the mission requirements while assuring the spraying action is performed in full as expected and planned, while minimizing resource expenses. First, the local update module 900 tries to calculate a possible response to the obstacle that can be performed by a single spraying vehicle. Next, the system update module 910 calculates changes that required adjustments by multiple spraying vehicles. The selected adjustment plan is then communicated to the spraying vehicle or vehicles by the updated plan module 920.

Figure 10:
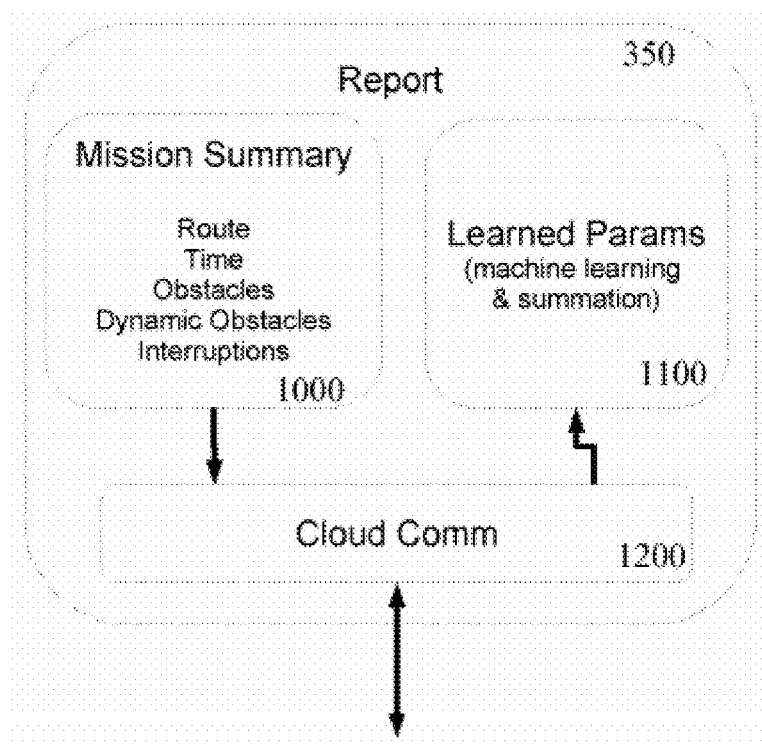
FIG. 10 is a block diagram of a reporting module.

FIG. 10 is a block diagram of a reporting module. The mission summary module 1000 offers a summary of the mission including all initial requirements, unexpected events and final results and performance. In addition, a system module 1100 reports to the system all the learned machine learning new data so that future missions can be better planned. The communications module 1200 assures communication to the system, system operator, system users as defined.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G/LTE, Wi-Fi.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, or Qualcomm Snapdragon that are adapted to communicate with the computer. Any number and type of machines may be in communication with the computer.

The invention claimed is:
1. A computerized system comprising:
at least one processor; and
at least one memory communicatively coupled to the at least one processor comprising computer-readable instructions that when executed by the at least one processor cause the computing system to implement a method of managing a fleet of spraying vehicles, the method comprising:
(i) selecting one or more field zones to be sprayed;
(ii) receiving field zone parameters for each selected field zone comprising at least selected spraying material and quantity for each field zone or portion of field zone;
(iii) receiving and processing field images to identify crop status and treatment requirements in sub-zones of a field zone;
(iv) receiving spraying vehicle parameters for each spraying vehicle in of the fleet;
(v) calculating a travel plan for each spraying vehicle of said fleet of spraying vehicles such that the selected field zones can be sprayed accordingly without spraying areas outside the selected field zones, wherein the travel plan includes, for each spraying vehicle, a flight path, speed and flying height, and all spraying vehicles maintain a predetermined safety distance from each other while flying;
(vi) once in operation, verifying that the predetermined safety distance is maintained between all spraying vehicles, and if the safety distance is not maintained, modifying one or more travel plans by taking one or more correction actions comprising:
modifying one or more flight paths, changing the order of one or more flight segments assigned to a spraying vehicle, reducing the speed of one or more spraying vehicles, increasing the speed of one or more spraying vehicles, or any combination thereof; and
(vii) once in operation, verifying travel plan execution of each spraying vehicle, and adjusting one or more travel plans in case of vehicle malfunctions, unexpected weather conditions, and unexpected field obstacles.

2. The system according to claim 1, wherein said fleet of spraying vehicles comprises any combination of: Unmanned Aerial Systems (UASs), aircrafts and ground vehicles.

3. The system according to claim 1, wherein the field zone parameters comprise one or more of: geographical limits of each field zone, takeoff and landing points, no-fly zones, field zone obstacles, legal limitations, required quantity of spraying material for each field zone.

4. The system according to claim 1, wherein the field zone parameters include one or more of: crop characteristics comprising type, status, age or height of crop; type of spraying material or materials to be used; and weather conditions.

5. The system according to claim 1, wherein the spraying vehicle parameters comprise one or more of: power supply capacity, spraying tank capacity, spray boom length, number of nozzles on each spray boom, spraying discharge speed, vehicle speed, vehicle sensors.

6. The system according to claim 5, wherein said vehicle sensors comprise: a camera, a light source, a klaxon, a Light Detection and Ranging (LIDAR), LED light sources, a Sonar detector, an Infrared (IR) sensor, a GPS sensor, or a Real Time Kinematic (RTK) receptor.

7. The system according to claim 1, wherein the zone parameters further comprise the furrow angle in one or more field zones.

8. The system according to claim 1, wherein all spraying vehicles are UASs.

9. The system according to claim 1, wherein the flight plan comprises the altitude of the UAS, UAS velocity, UAS angle, spraying material, spraying material discharge speed.

10. The system according to claim 1, wherein travel plans are optimized to provide one or more of: the shortest path travelled by the spraying vehicles; minimum energy usage; minimum U-turns; minimum returns to starting location; minimum time with full payload; minimum time at starting location; or minimum time to finish entire mission.

11. The system according to claim 1, wherein maintaining the safety distance is performed by calculating at predetermined intervals a distance between each spraying vehicle and its closest spraying vehicles.

12. The system according to claim 1, wherein the calculated travel plans maintain the safety distance between all spraying vehicles by taking into consideration the time of operation in addition to the flight path.

13. The system according to claim 1, wherein the spraying quantities and spraying materials are customized for each sub-zone.

14. The system according to claim 1, wherein the flight plan further comprises the spraying angle at each location.

15. The system according to claim 1, wherein the flight plan further comprises the method of maneuvering at each location.

16. The system according to claim 15, wherein the method of maneuvering comprises flying in a straight line, changing altitude, flying in a swing motion, flying in a zig-zag motion or any combination thereof.

17. A computerized method comprising: at least one processor; and
at least one memory communicatively coupled to the at least one processor comprising computer-readable instructions that when executed by the at least one processor implement a method of managing a fleet of spraying vehicles, the method comprising:
selecting one or more field zones to be sprayed;
(ii) receiving field zone parameters for each selected field zone comprising at least selected spraying material and quantity for each field zone or portion of field zone;
(iii) receiving and processing field images to identify crop status and treatment requirements in sub-zones of a field zone;
(iv) receiving spraying vehicle parameters for each spraying vehicle in of the fleet;
(v) calculating a travel plan for each spraying vehicle of said fleet of spraying vehicles such that the selected field zones can be sprayed accordingly without spraying areas outside the selected field zones, and all spraying vehicles maintain a predetermined safety distance from each other while flying;
(vi) once in operation, verifying that a predetermined safety distance is maintained between all spraying vehicles, and if the safety distance is not maintained, modifying one or more travel plans by taking one or more correction actions comprising: modifying one or more flight paths, changing the order of one or more flight segments assigned to a spraying vehicle, reducing the speed of one or more spraying vehicles, increasing the speed of one or more spraying vehicles, or any combination thereof; and (vii) once in operation, verifying travel plan execution of each spraying vehicle, and adjusting one or more travel plans in case of vehicle malfunctions, unexpected weather conditions, and unexpected field obstacles.

* * * * *